(12) United States Patent
Saito et al.

(10) Patent No.: US 11,190,070 B2
(45) Date of Patent: Nov. 30, 2021

(54) ROTOR FOR ROTATING ELECTRICAL MACHINE

(71) Applicant: AISIN AW CO., LTD., Anjo (JP)

(72) Inventors: Naoto Saito, Nishio (JP); Masayuki Ikemoto, Anjo (JP); Tsuyoshi Miyaji, Toyohashi (JP)

(73) Assignee: AISIN AW CO., LTD., Anjo (JP)

(*) Notice: Subject to any disclaimer, the term of this patent is extended or adjusted under 35 U.S.C. 154(b) by 103 days.

(21) Appl. No.: 16/468,924

(22) PCT Filed: Dec. 18, 2017

(86) PCT No.: PCT/JP2017/045316
§ 371 (c)(1),
(2) Date: Jun. 12, 2019

(87) PCT Pub. No.: WO2018/131393
PCT Pub. Date: Jul. 19, 2018

(65) Prior Publication Data
US 2020/0021153 A1    Jan. 16, 2020

(30) Foreign Application Priority Data

Jan. 12, 2017    (JP) .............................. JP2017-003527

(51) Int. Cl.
*H02K 1/27*        (2006.01)
(52) U.S. Cl.
CPC .................................. *H02K 1/2766* (2013.01)
(58) Field of Classification Search
CPC .................................................... H02K 1/2766

USPC ............. 310/156.56, 156.53, 156.57, 156.83
See application file for complete search history.

(56) References Cited

U.S. PATENT DOCUMENTS

| 2003/0102755 | A1 | 6/2003 | Naito et al. | |
| 2010/0079026 | A1* | 4/2010 | Han | H02K 1/2766 |
| | | | | 310/156.53 |
| 2011/0025309 | A1* | 2/2011 | Saruki | G01D 5/145 |
| | | | | 324/207.21 |
| 2012/0200188 | A1 | 8/2012 | Sano et al. | |
| 2015/0229170 | A1* | 8/2015 | Koechlin | H02K 1/2766 |
| | | | | 310/156.53 |

FOREIGN PATENT DOCUMENTS

| JP | 2002-78259 | A | 3/2002 | |
| JP | 2005094940 | * | 4/2005 | ............... H02K 1/27 |

(Continued)

OTHER PUBLICATIONS

Attached translated version of foreign patent JP200509490. (Year: 2005).*

(Continued)

*Primary Examiner* — Shawki S Ismail
*Assistant Examiner* — Htet Z Kyaw
(74) *Attorney, Agent, or Firm* — Oliff PLC

(57) ABSTRACT

A rotor for a rotating electrical machine, the rotor including: a rotor core having a plurality of magnetic poles; and a plurality of permanent magnets arranged in the rotor core, wherein: in each of the plurality of magnetic poles, the rotor core has a plurality of holes including a first hole and a second hole in each of which a respective permanent magnet of the plurality of permanent magnets having a planar magnetic pole surface is arranged.

7 Claims, 7 Drawing Sheets

(56) References Cited

FOREIGN PATENT DOCUMENTS

| | | |
|---|---|---|
| JP | 2010-093906 A | 4/2010 |
| JP | 2012-165482 A | 8/2012 |
| JP | 2015-186383 A | 10/2015 |

OTHER PUBLICATIONS

Feb. 27, 2018 International Search Report issued in International Patent Application No. PCT/JP2017/045316.

* cited by examiner

ROTOR FOR ROTATING ELECTRICAL MACHINE

BACKGROUND

The present disclosure relates to a rotor for a rotating electrical machine, which includes a rotor core and permanent magnets arranged in the rotor core.

As an example of a rotor for a rotating electrical machine, there is known a rotor for a rotating electrical machine that is described in Japanese Patent Application Publication No. 2012-165482 (JP 2012-165482 A). A rotor (10) described in JP 2012-165482 A includes a pair of permanent magnets (26) and a magnetic flux suppression hole (28) in each of a plurality of magnetic poles (24). At a magnet insertion hole (32) where the permanent magnet (26) is inserted, a first hole (28a) is formed so as to communicate with the magnet insertion hole (32). In the structure illustrated in FIG. 2 and FIG. 3 of JP 2012-165482 A, the magnetic flux suppression hole (28) is structured by two first holes (28a, 28a) and one second hole (28b). Bridge portions (36) are formed between one first hole (28a) and the second hole (28b) and between the other first hole (28a) and the second hole (28b). The second hole (28b) is arranged in an area in a circumferential direction that includes a magnetic pole center line (C). The bridge portion (36) is an offset bridge portion formed at a position shifted in the circumferential direction from the magnetic pole center line (C).

As described in paragraph 0039 of JP 2012-165482 A regarding centrifugal resistance strength, it is necessary that the bridge portion such as an offset bridge portion be formed into such a size that the strength of a rotor core is a strength enough to resist a centrifugal force during rotation of the rotor. An output torque of the rotating electrical machine generally decreases as the amount of a magnetic flux passing through the bridge portion (amount of a leakage flux) increases. From the viewpoint of improving the output torque of the rotating electrical machine, it is desirable to minimize the width of the bridge portion. However, JP 2012-165482 A does not describe a technology for reducing the width of the offset bridge portion.

SUMMARY

There is a demand to attain a rotor for a rotating electrical machine in which the width of an offset bridge portion can be reduced while appropriately securing the strength of a rotor core against a centrifugal force.

In view of the above, a first characteristic structure of a rotor for a rotating electrical machine, the rotor including the rotor comprising: a rotor core having a plurality of magnetic poles; and a plurality of permanent magnets arranged in the rotor core, wherein: in each of the plurality of magnetic poles, the rotor core has a plurality of holes including a first hole and a second hole in each of which a respective permanent magnet of the plurality of permanent magnets having a planar magnetic pole surface is arranged, the first hole and the second hole are separately arranged on both sides in a circumferential direction with respect to a magnetic pole center line extending in a radial direction through a center of a magnetic pole of the plurality of magnetic poles in the circumferential direction so that a separation distance between the first hole and the second hole in the circumferential direction increases toward an outer side in the radial direction, the rotor core has a plurality of bridges each formed between two holes of the plurality of holes that are adjacent to each other in the circumferential direction, the plurality of bridges include an offset bridge located at a position shifted in the circumferential direction from the magnetic pole center line, and an extending direction of the offset bridge in a cross section orthogonal to an axial direction is inclined with respect to the magnetic pole center line so as to approach the magnetic pole center line toward the outer side in the radial direction.

According to the first characteristic structure described above, the extending direction of the offset bridge in the cross section orthogonal to the axial direction is the direction inclined with respect to the magnetic pole center line so as to approach the magnetic pole center line toward the outer side in the radial direction. Therefore, stress concentration on the offset bridge can be mitigated during rotation of the rotor (rotor for a rotating electrical machine) as compared to a case where the extending direction is set as a direction parallel to the magnetic pole center line. As a result, the width of the offset bridge can be reduced while appropriately securing the strength of the rotor core against the centrifugal force.

To give supplementary description, during the rotation of the rotor, the offset bridge supports, against the centrifugal force, a radially outer portion of the rotor core in the magnetic pole where the offset bridge is provided (hereinafter referred to as "support target portion" in this paragraph). When consideration is made using a simplified model, the centrifugal force is applied to the center of gravity of an object. Therefore, a tensile load toward the center of gravity of the support target portion is applied to the offset bridge during the rotation of the rotor. The sectional shape orthogonal to the axial direction at a portion of the rotor core that structures one magnetic pole is a symmetrical shape or a shape analogous to the symmetrical shape across an axis of symmetry defined along the magnetic pole center line. Therefore, the center of gravity of the support target portion is generally located on an outer side in the radial direction and on a magnetic pole center side in the circumferential direction with respect to the offset bridge. In this respect, according to the first characteristic structure described above, the extending direction of the offset bridge in the cross section orthogonal to the axial direction is the direction that approaches the magnetic pole center line toward the outer side in the radial direction. Thus, the extending direction of the offset bridge is brought closer to the direction in which the tensile load is applied, and a flexural stress generated in the offset bridge during the rotation of the rotor can be reduced as compared to the case where the extending direction is set as the direction parallel to the magnetic pole center line. Along with the reduction of the flexural stress generated in the offset bridge, the stress concentration on the offset bridge can be mitigated during the rotation of the rotor. As a result, the width of the offset bridge can be reduced while securing the strength of the rotor core against the centrifugal force.

As described above, according to the first characteristic structure described above, it is possible to attain the rotor for a rotating electrical machine in which the width of the offset bridge can be reduced while appropriately securing the strength of the rotor core against the centrifugal force.

According to the first characteristic structure described above, the permanent magnet having the planar magnetic pole surface can be used as the permanent magnet arranged in each of the first hole and the second hole. Thus, there is an advantage in that a necessary remanent flux density is secured easily while reducing costs as compared to a case of using a permanent magnet having a curved magnetic pole surface. Further, the first hole and the second hole are arranged so that the separation distance therebetween in the circumferential direction increases toward the outer side in the radial direction. Thus, there is an advantage in that a reluctance torque can be used.

In view of the above, a second characteristic structure of the rotor for a rotating electrical machine, the rotor including a rotor core having a plurality of magnetic poles; and a plurality of permanent magnets arranged in the rotor core, wherein in each of the plurality of magnetic poles, the rotor core has a plurality of holes including magnet insertion holes where the permanent magnets are arranged, the plurality of holes in each of the plurality of magnetic poles are arranged so as to form a surrounding hole group that surrounds a magnetic pole center point that is an intersection of an outer peripheral surface of the rotor core and a magnetic pole center line extending in a radial direction through a center of a magnetic pole of the plurality of magnetic poles in a circumferential direction, the rotor core has a plurality of bridges each formed between two holes of the plurality of holes that are adjacent to each other in the circumferential direction, the plurality of bridges include an offset bridge located at a position shifted in the circumferential direction from the magnetic pole center line, and an extending direction of the offset bridge in a cross section orthogonal to an axial direction is set along a direction to a center of gravity of a target surrounded by the surrounding hole group.

According to the second characteristic structure described above, the extending direction of the offset bridge in the cross section orthogonal to the axial direction is set along the direction to the center of gravity of the target surrounded by the surrounding hole group. Therefore, the stress concentration on the offset bridge can be mitigated during the rotation of the rotor as compared to the case where the extending direction is set as the direction parallel to the magnetic pole center line. As a result, the width of the offset bridge can be reduced while appropriately securing the strength of the rotor core against the centrifugal force.

To give supplementary description, during the rotation of the rotor, the offset bridge supports, against the centrifugal force, the target surrounded by the surrounding hole group. When consideration is made using a simplified model, the centrifugal force is applied to the center of gravity of an object. Therefore, a tensile load toward the center of gravity of the target is applied to the offset bridge during the rotation of the rotor. In this respect, according to the second characteristic structure described above, the extending direction of the offset bridge in the cross section orthogonal to the axial direction is set along the direction to the center of gravity of the target. Thus, the extending direction of the offset bridge coincides with the direction in which the tensile load is applied, and the flexural stress generated in the offset bridge during the rotation of the rotor can be reduced. Along with the reduction of the flexural stress generated in the offset bridge, the stress concentration on the offset bridge can be mitigated during the rotation of the rotor. As a result, the width of the offset bridge portion can be reduced while securing the strength of the rotor core against the centrifugal force.

As described above, according to the second characteristic structure described above, it is possible to attain the rotor for a rotating electrical machine in which the width of the offset bridge can be reduced while appropriately securing the strength of the rotor core against the centrifugal force.

According to the second characteristic structure described above, the plurality of holes is arranged so as to form the surrounding hole group that surrounds the magnetic pole center point. Thus, there is an advantage in that the reluctance torque can be used.

In view of the above, a third characteristic structure of the rotor for a rotating electrical machine, the rotor including the rotor including a rotor core having a plurality of magnetic poles; and a permanent magnet arranged in the rotor core, wherein in each of the plurality of magnetic poles, the rotor core has a plurality of holes including a first hole and a second hole in each of which the permanent magnet having a planar magnetic pole surface is arranged, the first hole and the second hole are separately arranged on both sides in a circumferential direction with respect to a magnetic pole center line extending in a radial direction through a center of a magnetic pole of the plurality of magnetic poles in the circumferential direction so that a separation distance between the first hole and the second hole in the circumferential direction increases toward an outer side in the radial direction, the rotor core has a plurality of bridges each formed between two of the holes that are adjacent to each other in the circumferential direction, the plurality of bridges include an offset bridge located at a position shifted in the circumferential direction from the magnetic pole center line, and in a cross section orthogonal to an axial direction, the offset bridge is formed so as to extend toward a center of gravity on the magnetic pole center line that corresponds to the magnetic pole where the offset bridge is formed.

According to the third characteristic structure described above, in the cross section orthogonal to the axial direction, the offset bridge is formed so as to extend toward the center of gravity on the magnetic pole center line that corresponds to the magnetic pole where the offset bridge is formed. Therefore, the stress concentration on the offset bridge can be mitigated during the rotation of the rotor (rotor for a rotating electrical machine) as compared to a case where the offset bridge is not formed so as to extend toward the center of gravity. As a result, the width of the offset bridge can be reduced while appropriately securing the strength of the rotor core against the centrifugal force.

To give supplementary description, during the rotation of the rotor, the offset bridge supports, against the centrifugal force, the radially outer portion of the rotor core in the magnetic pole where the offset bridge is provided. When consideration is made using a simplified model, the centrifugal force is applied to the center of gravity of an object. Therefore, a tensile load toward the center of gravity on the magnetic pole center line that corresponds to each magnetic pole is applied to the offset bridge during the rotation of the rotor. In this respect, according to the third characteristic structure described above, in the cross section orthogonal to the axial direction, the offset bridge is formed so as to extend toward the center of gravity on the magnetic pole center line that corresponds to each magnetic pole. Thus, the direction of the offset bridge coincides with the direction in which the tensile load is applied, and the flexural stress generated in the offset bridge during the rotation of the rotor can be reduced. Along with the reduction of the flexural stress generated in the offset bridge, the stress concentration on the offset bridge can be mitigated during the rotation of the rotor. As a result, the width of the offset bridge can be reduced while securing the strength of the rotor core against the centrifugal force.

As described above, according to the third characteristic structure described above, it is possible to attain the rotor for a rotating electrical machine in which the width of the offset bridge can be reduced while appropriately securing the strength of the rotor core against the centrifugal force.

According to the third characteristic structure described above, the permanent magnet having the planar magnetic pole surface can be used as the permanent magnet arranged in each of the first hole and the second hole. Thus, there is an advantage in that a necessary remanent flux density is secured easily while reducing costs as compared to the case of using the permanent magnet having the curved magnetic pole surface. Further, the first hole and the second hole are arranged so that the separation distance therebetween in the circumferential direction increases toward the outer side in the radial direction. Thus, there is an advantage in that the reluctance torque can be used.

Further features and advantages of the rotor for a rotating electrical machine will become apparent from the following description of embodiments with reference to the drawings.

DETAILED DESCRIPTION OF EMBODIMENTS

An embodiment of a rotor for a rotating electrical machine is described with reference to the drawings. In the following description, an "axial direction L", a "radial direction R", and a "circumferential direction C" are defined with respect to an axis A (see FIG. 1) of the rotor for a rotating electrical machine (hereinafter referred to as "rotor 2"). The axis A is an imaginary axis, and the rotor 2 rotates about the axis A. As illustrated in FIG. 2, one side in the circumferential direction C is defined as a "first circumferential side C1", and the other side in the circumferential direction C (side opposite to the first circumferential side C1) is defined as a "second circumferential side C2". Terms related to dimensions, arrangement directions, arrangement positions, and the like are herein used as concepts that encompass a condition with a difference caused by a deviation (deviation that is permissible in manufacturing).

Figure 1:
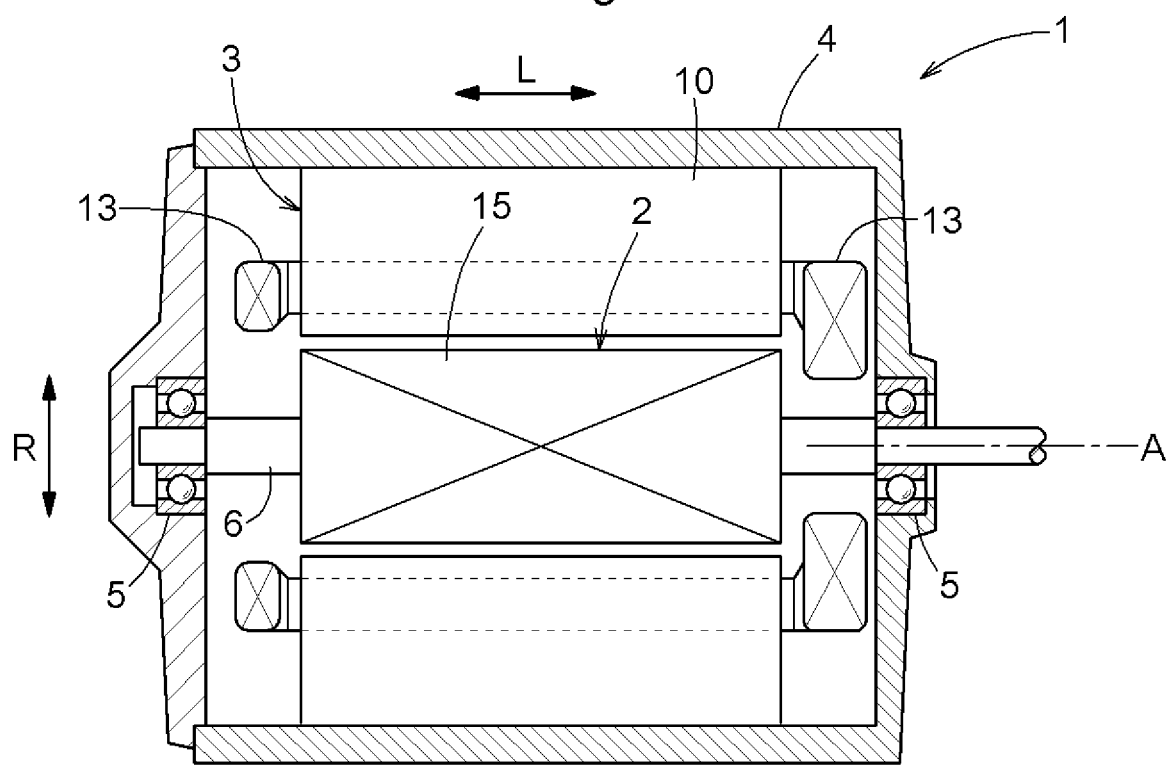
FIG. 1 is a view illustrating a rotating electrical machine according to an embodiment.
Figure 2:
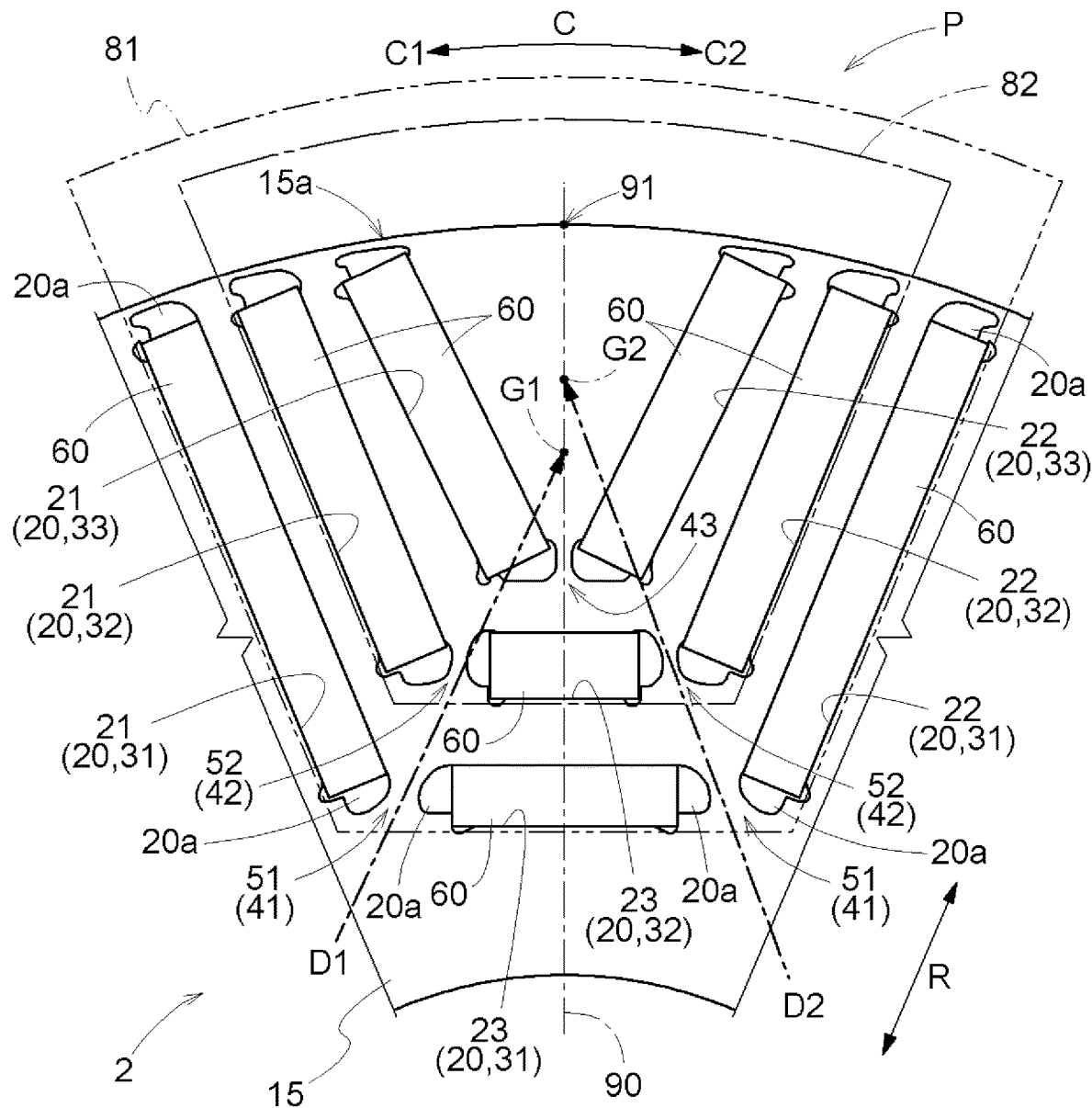
FIG. 2 is a sectional view orthogonal to an axial direction, illustrating a part of a rotor according to the embodiment.

As illustrated in FIG. 1, the rotor 2 is a rotor for a rotating electrical machine, and is used for a rotating electrical machine 1 together with a stator 3. In an example illustrated in FIG. 1, the rotating electrical machine 1 is housed in a case 4, a stator core 10 that is a core of the stator 3 is fixed to the case 4 (in this case, an inner surface of the case 4), and the rotor 2 is supported so as to be rotatable relative to the case 4. Specifically, the rotating electrical machine 1 includes a rotor shaft 6 supported so as to be rotatable relative to the case 4 via bearings 5, and a rotor core 15 that is a core of the rotor 2 is coupled to the rotor shaft 6 so as to rotate together with the rotor shaft 6.

The rotor core 15 is arranged so as to face the stator core 10 in the radial direction R. Specifically, the rotor 2 is a rotor for an inner rotor type rotating electrical machine, and the rotor core 15 is arranged on an inner side in the radial direction R with respect to the stator core 10 at a position where the rotor core 15 overlaps the stator core 10 when viewed in the radial direction R. The rotating electrical machine 1 is a revolving field type rotating electrical machine, and coils 13 are would around the stator core 10. The rotor 2 serving as a field system rotates by a magnetic field generated from the stator 3. The "rotating electrical machine" is herein used as a concept that encompasses any of a motor (electric motor), a generator (power generator), and a motor/generator that functions as both the motor and the generator as necessary.

As illustrated in FIG. 2, the rotor 2 includes the rotor core 15 and permanent magnets 60 arranged (embedded) in the rotor core 15. That is, the rotor 2 is a rotor to be used for a rotating electrical machine having an embedded magnet structure (for example, a synchronous electric motor). For example, the rotor core 15 is formed by stacking a plurality of annular sheet-shaped magnetic sheets (for example, electromagnetic steel sheets) in the axial direction L, or is formed by including, as a main component, a green compact obtained through pressure molding of magnetic powder that is powder of a magnetic material. In each magnetic pole P, the rotor core 15 has a plurality of holes 20 extending in the axial direction L. Each hole 20 is formed so as to pass through the rotor core 15 in the axial direction L. In this embodiment, each hole 20 is formed so as to extend in parallel to the axial direction L. In this embodiment, each hole 20 is formed such that its sectional shape orthogonal to the axial direction L is uniform (identical) along the axial direction L. In the rotor core 15, a plurality of magnetic poles P are formed along the circumferential direction C. Magnetic poles P adjacent to each other in the circumferential direction C have opposite polarities. FIG. 2 illustrates an area in the rotor core 15 where one magnetic pole P is formed.

The plurality of holes 20 provided in one magnetic pole P include first holes 21 arranged on the first circumferential side C1 with respect to a magnetic pole center line 90, and second holes 22 arranged on the second circumferential side C2 with respect to the magnetic pole center line 90. The magnetic pole center line 90 is a line extending in the radial direction R through the center of the magnetic pole P in the circumferential direction C. Specifically, the magnetic pole center line 90 is a straight line (imaginary line) extending in parallel to the radial direction R through the center of the magnetic pole P in the circumferential direction C in a cross section of the rotor core 15 that is orthogonal to the axial direction L. In this embodiment, the plurality of holes 20 provided in one magnetic pole P further include third holes 23 arranged in an area in the circumferential direction C that includes the magnetic pole center line 90 (specifically, third holes 23 whose central positions in the circumferential direction C coincide with the center of the magnetic pole P in the circumferential direction C).

In each of the plurality of magnetic poles P, the rotor core 15 has the plurality of holes 20 including magnet insertion holes where the permanent magnets 60 are arranged. In this embodiment, all of the first holes 21, the second holes 22, and the third holes 23 are the magnet insertion holes. In this embodiment, a permanent magnet having a flat-plate shape is used as the permanent magnet 60. That is, the permanent magnet 60 is formed such that its sectional shape orthogonal to the axial direction L is uniform along the axial direction L. The sectional shape is rectangular. The permanent magnet 60 has magnetic pole surfaces F each having a flat-plate shape (see FIG. 3). The magnetic pole surface F is an outer surface orthogonal to a magnetizing direction (polarizing direction), and is a surface where a magnetic flux of the permanent magnet 60 passes in and out. In this embodiment, the magnetic pole surfaces F are two surfaces that define the long sides of the rectangle out of the outer peripheral surfaces of the permanent magnet 60 (four surfaces that define the outer edges of the cross section orthogonal to the axial direction L). In this embodiment, the plurality of holes 20 provided in each magnetic pole P include the first holes 21 and the second holes 22 in each of which the permanent magnet 60 having the planar magnetic pole surfaces F is arranged.

In the cross section orthogonal to the axial direction L, a part or the whole of the area in the magnet insertion hole is a magnet arrangement area where the permanent magnet 60 is arranged. In this embodiment, only a part of the area in the magnet insertion hole is the magnet arrangement area in the cross section orthogonal to the axial direction L. Magnetic resistance portions 20a that function as magnetic resistances (flux barriers) to the magnetic flux flowing through the rotor core 15 are formed at portions of the magnet insertion hole on both sides in a direction along the magnetic pole surface F with respect to the magnet arrangement area. The magnetic resistance portion 20a is a hollow (air space), or is filled with a filler (for example, a resin) having a magnetic permeability lower than that of the rotor core 15 (for example, magnetic sheets such as electromagnetic steel sheets).

As illustrated in FIG. 2, the plurality of holes 20 in each of the plurality of magnetic poles P are arranged so as to form a first surrounding hole group 31 that surrounds a magnetic pole center point 91 that is an intersection of the magnetic pole center line 90 and an outer peripheral surface 15a of the rotor core 15. That is, the rotor core 15 has a plurality of holes 20 that form the first surrounding hole group 31 in each of the plurality of magnetic poles P. The plurality of holes 20 that form the first surrounding hole group 31 include the first hole 21 and the second hole 22, and further include the third hole 23 in this embodiment. Specifically, the first surrounding hole group 31 is formed by one first hole 21, one second hole 22, and one third hole 23. In this embodiment, the first surrounding hole group 31 corresponds to a "surrounding hole group".

In this embodiment, the rotor core 15 has a plurality of holes 20 that form a second surrounding hole group 32 in each of the plurality of magnetic poles P in addition to the plurality of holes 20 that form the first surrounding hole group 31. In this embodiment, the rotor core 15 further has a plurality of holes 20 that form a third surrounding hole group 33 in each of the plurality of magnetic poles P. The second surrounding hole group 32 is a hole group that surrounds the magnetic pole center point 91 on a side closer to the magnetic pole center point 91 than the first surrounding hole group 31. A flow of a q-axis magnetic flux is formed between the first surrounding hole group 31 and the second surrounding hole group 32. The third surrounding hole group 33 is a hole group that surrounds the magnetic pole center point 91 on a side closer to the magnetic pole center point 91 than the second surrounding hole group 32. A flow of a q-axis magnetic flux is formed between the second surrounding hole group 32 and the third surrounding hole group 33. The plurality of holes 20 that form the second surrounding hole group 32 include the first hole 21 and the second hole 22, and further include the third hole 23 in this embodiment. Specifically, the second surrounding hole group 32 is formed by one first hole 21, one second hole 22, and one third hole 23. The plurality of holes 20 that form the third surrounding hole group 33 include the first hole 21 and the second hole 22, but do not include the third hole 23 in this embodiment. Specifically, the third surrounding hole group 33 is formed by one first hole 21 and one second hole 22.

Focusing on a pair of the first hole 21 and the second hole 22, as illustrated in FIG. 2, the first hole 21 and the second hole 22 are separately arranged on both sides in the circumferential direction C with respect to the magnetic pole center line 90 so that a separation distance between the first hole 21 and the second hole 22 in the circumferential direction C increases toward an outer side in the radial direction R. The "pair of the first hole 21 and the second hole 22" refers to the first hole 21 and the second hole 22 that belong to the same surrounding hole group (in this embodiment, the first surrounding hole group 31, the second surrounding hole group 32, or the third surrounding hole group 33). If the plurality of holes 20 that form one surrounding hole group include a plurality of first holes 21 and a plurality of second holes 22, the "pair of the first hole 21 and the second hole 22" refers to a first hole 21 and a second hole 22 that belong to the same surrounding hole group and are arranged at the same position in the radial direction R. As described above, the permanent magnet 60 is a permanent magnet having a flat-plate shape in this embodiment, and therefore each of the first hole 21 and the second hole 22 is formed so as to extend linearly along the magnetic pole surface F having a flat-plate shape in the permanent magnet 60 in the cross section orthogonal to the axial direction L. In this embodiment, the sectional shape orthogonal to the axial direction L at a portion of the rotor core 15 that structures one magnetic pole P is a symmetrical shape across an axis of symmetry defined along the magnetic pole center line 90. That is, the pair of the first hole 21 and the second hole 22 has a symmetrical shape across the axis of symmetry defined along the magnetic pole center line 90 in the cross section orthogonal to the axial direction L. In this embodiment, the pair of the first hole 21 and the second hole 22 is arranged in a V-shape so that the distance therebetween increases toward the outer side in the radial direction R in the cross section orthogonal to the axial direction L.

The rotor core 15 has a plurality of first bridge portions 41 each formed between two holes 20 adjacent to each other in the circumferential direction C. The first bridge portion 41 is formed between the plurality of holes 20 that form the first surrounding hole group 31. That is, the rotor core 15 has a plurality of first bridge portions 41 each formed between the plurality of holes 20 that form the first surrounding hole group 31. As illustrated in FIG. 2, in this embodiment, the first bridge portions 41 are formed between the first hole 21 and the third hole 23 adjacent to each other in the circumferential direction C (in other words, adjacent to each other in an array direction of the plurality of holes 20 that form the first surrounding hole group 31; the same applies hereinafter), and between the second hole 22 and the third hole 23 adjacent to each other in the circumferential direction C. In this embodiment, the magnetic resistance portions 20a of two holes 20 that form the first surrounding hole group 31 are arranged adjacent to each other in the circumferential direction C, and the first bridge portion 41 is formed between the two magnetic resistance portions 20a adjacent to each other in the circumferential direction C. An outer peripheral bridge portion is formed between the outer peripheral surface 15a of the rotor core 15 and each of two holes 20 (in this embodiment, the first hole 21 and the second hole 22) arranged at both ends (both ends in the array direction) out of the plurality of holes 20 that form the first surrounding hole group 31. In this embodiment, the first bridge portion 41 corresponds to a "bridge portion".

In this embodiment, the rotor core 15 has a plurality of second bridge portions 42 each formed between the plurality of holes 20 that form the second surrounding hole group 32. In this embodiment, the second bridge portions 42 are formed between the first hole 21 and the third hole 23 adjacent to each other in the circumferential direction C (in other words, adjacent to each other in an array direction of the plurality of holes 20 that form the second surrounding hole group 32; the same applies hereinafter), and between the second hole 22 and the third hole 23 adjacent to each other in the circumferential direction C. In this embodiment, the magnetic resistance portions 20a of two holes 20 that form the second surrounding hole group 32 are arranged adjacent to each other in the circumferential direction C, and the second bridge portion 42 is formed between the two magnetic resistance portions 20a adjacent to each other in the circumferential direction C. An outer peripheral bridge portion is formed between the outer peripheral surface 15a of the rotor core 15 and each of two holes 20 (in this embodiment, the first hole 21 and the second hole 22) arranged at both ends (both ends in the array direction) out of the plurality of holes 20 that form the second surrounding hole group 32.

In this embodiment, the rotor core 15 has a third bridge portion 43 formed between the plurality of holes 20 that form the third surrounding hole group 33. In this embodiment, the rotor core 15 has only one third bridge portion 43. The one third bridge portion 43 is formed between the first hole 21 and the second hole 22 adjacent to each other in the circumferential direction C (in other words, adjacent to each other in an array direction of the plurality of holes 20 that form the third surrounding hole group 33; the same applies hereinafter). In this embodiment, the magnetic resistance portions 20a of two holes 20 that form the third surrounding hole group 33 are arranged adjacent to each other in the circumferential direction C, and the third bridge portion 43 is formed between the two magnetic resistance portions 20a adjacent to each other in the circumferential direction C. An outer peripheral bridge portion is formed between the outer peripheral surface 15a of the rotor core 15 and each of two holes 20 (in this embodiment, the first hole 21 and the second hole 22) arranged at both ends (both ends in the array direction) out of the plurality of holes 20 that form the third surrounding hole group 33.

As illustrated in FIG. 1, the plurality of first bridge portions 41 include first offset bridge portions 51 (offset bridges) located at positions shifted in the circumferential direction C from the magnetic pole center line 90. Specifically, the first bridge portion 41 formed between the first hole 21 and the third hole 23 is a first offset bridge portion 51 located at a position shifted to the first circumferential side C1 from the magnetic pole center line 90, and the first bridge portion 41 formed between the second hole 22 and the third hole 23 is a first offset bridge portion 51 located at a position shifted to the second circumferential side C2 from the magnetic pole center line 90. In this embodiment, the first offset bridge portion 51 corresponds to an "offset bridge portion".

In this embodiment, the plurality of second bridge portions 42 include second offset bridge portions 52 located at positions shifted in the circumferential direction C from the magnetic pole center line 90. Specifically, the second bridge portion 42 formed between the first hole 21 and the third hole 23 is a second offset bridge portion 52 located at a position shifted to the first circumferential side C1 from the magnetic pole center line 90, and the second bridge portion 42 formed between the second hole 22 and the third hole 23 is a second offset bridge portion 52 located at a position shifted to the second circumferential side C2 from the magnetic pole center line 90.

An output torque of the rotating electrical machine 1 generally decreases as the amount of a magnetic flux passing through each bridge portion (in this embodiment, each of the first bridge portion 41, the second bridge portion 42, and the third bridge portion 43) (amount of a leakage flux) increases. Therefore, it is desirable to minimize the width of each bridge portion within a range in which the strength of the rotor core 15 against a centrifugal force can be secured appropriately. The width of the bridge portion is a width in a direction orthogonal to an extending direction of the bridge portion in the cross section orthogonal to the axial direction L (substantially a width in the circumferential direction C or a width in a direction orthogonal to the magnetic pole center line 90). In this respect, the rotor 2 disclosed herein has a structure described below, whereby the width of the offset bridge portion (in this embodiment, each of the first offset bridge portion 51 and the second offset bridge portion 52) can be reduced while appropriately securing the strength of the rotor core 15 against the centrifugal force.

As illustrated in FIG. 2, a portion of the rotor core 15 that is surrounded by the first surrounding hole group 31 is defined as a first target portion 81 (first target). An outer edge of the first target portion 81 on an outer side in the radial direction R is formed along the outer peripheral surface 15a of the rotor core 15, but is illustrated on an outer side in the radial direction R with respect to the outer peripheral surface 15a in FIG. 2 to facilitate understanding. The outer edges of the first target portion 81 on both sides in the circumferential direction C and the outer edge of the first target portion 81 on an inner side in the radial direction R are formed along the arrangement areas of the plurality of holes 20 that form the first surrounding hole group 31. That is, the outer edge of the first target portion 81 on the first circumferential side C1 is formed along the arrangement area of the first hole 21 that belongs to the first surrounding hole group 31 so as to extend in an extending direction of the first hole 21 (in this case, the radial direction R). The outer edge of the first target portion 81 on the inner side in the radial direction R is formed along the arrangement area of the third hole 23 that belongs to the first surrounding hole group 31 so as to extend in an extending direction of the third hole 23 (in this case, the direction orthogonal to the magnetic pole center line 90). The outer edge of the first target portion 81 on the second circumferential side C2 is formed along the arrangement area of the second hole 22 that belongs to the first surrounding hole group 31 so as to extend in an extending direction of the second hole 22 (in this case, the radial direction R). FIG. 2 illustrates an exemplary case where the first target portion 81 is set so as to include the plurality of holes 20 that form the first surrounding hole group 31, but the first target portion 81 may be set so as not to include the plurality of holes 20 that form the first surrounding hole group 31. In this embodiment, the first target portion 81 corresponds to a "target portion".

During rotation of the rotor 2, the first offset bridge portions 51 support the first target portion 81 described above against the centrifugal force. When consideration is made using a simplified model, the centrifugal force is applied to a first center of gravity G1 that is the center of gravity of the first target portion 81. Therefore, a tensile load toward the first center of gravity G1 is applied to the first offset bridge portions 51 during the rotation of the rotor 2. The first center of gravity G1 is the center of gravity of the mass (center of mass) of the first target portion 81, and is a center of gravity in a state in which the permanent magnets 60 are arranged in the holes 20 that are used as the magnet insertion holes. In view of the fact that the tensile load toward the first center of gravity G1 is applied to the first offset bridge portions 51 as described above, as illustrated in FIG. 2, a first extending direction D1 that is an extending direction of the first offset bridge portion 51 in the cross section orthogonal to the axial direction L is set as a direction inclined with respect to the magnetic pole center line 90 so as to approach the magnetic pole center line 90 toward the outer side in the radial direction R (from the first offset bridge portion 51). As illustrated in FIG. 2, the first center of gravity G1 is located on an outer side in the radial direction R and on a magnetic pole center side in the circumferential direction C with respect to the first offset bridge portion 51. By setting the first extending direction D1 as the direction described above, the first extending direction D1 is brought closer to the direction in which the tensile load is applied, and a flexural stress generated in the first offset bridge portion 51 during the rotation of the rotor 2 can be reduced as compared to a case where the first extending direction D1 is set as a direction parallel to the magnetic pole center line 90. In FIG. 2, the first extending direction D1 is illustrated only for one first offset bridge portion 51 out of the pair of first offset bridge portions 51 separately arranged on both sides in the circumferential direction with respect to the magnetic pole center line 90. The first extending directions D1 of the pair of first offset bridge portions 51 are symmetrical directions across an axis of symmetry defined along the magnetic pole center line 90.

In order to further reduce the flexural stress generated in the first offset bridge portion 51 during the rotation of the rotor 2, this embodiment provides a structure in which the first extending direction D1 is set along a direction to the first center of gravity G1 (from the first offset bridge portion 51) as illustrated in FIG. 2. By setting the first extending direction D1 in this manner, the first extending direction D1 coincides with the direction in which the tensile load is applied, and the flexural stress generated in the first offset bridge portion 51 during the rotation of the rotor 2 can further be reduced. Along with the reduction of the flexural stress generated in the first offset bridge portion 51, stress concentration on the first offset bridge portion 51 can be mitigated during the rotation of the rotor 2. As a result, the width of the first offset bridge portion 51 can be reduced while securing the strength of the rotor core 15 against the centrifugal force. The "direction to the first center of gravity G1" is a concept that encompasses not only a case where the first center of gravity G1 is accurately located on an extension line of the direction but also a case where the first center of gravity G1 deviates from the extension line within a range in which the direction is regarded as the direction to the first center of gravity G1. The same applies to a "direction to a second center of gravity G2" described later. In other words, the first center of gravity G1 and the second center of gravity G2 may be regarded as areas that spread to some extent.

This embodiment further provides a structure in which a second extending direction D2 that is an extending direction of the second offset bridge portion 52 in the cross section orthogonal to the axial direction L is set along a direction to the second center of gravity G2 that is the center of gravity of a second target portion 82 (from the second offset bridge portion 52). As illustrated in FIG. 2, the second target portion 82 is a portion of the rotor core 15 that is surrounded by the second surrounding hole group 32. The second target portion 82 is set similarly to the first target portion 81 except that the first surrounding hole group 31 is replaced with the second surrounding hole group 32, and therefore detailed description is omitted. During the rotation of the rotor 2, the second offset bridge portions 52 support the second target portion 82 against the centrifugal force. When consideration is made using a simplified model, a tensile load toward the second center of gravity G2 is applied to the second offset bridge portions 52 during the rotation of the rotor 2. In this respect, the second extending direction D2 coincides with the direction in which the tensile load is applied, and a flexural stress generated in the second offset bridge portion 52 during the rotation of the rotor 2 can be reduced in this embodiment because the second extending direction D2 is set along the direction to the second center of gravity G2 (from the second offset bridge portion 52) as described above. Along with the reduction of the flexural stress generated in the second offset bridge portion 52, stress concentration on the second offset bridge portion 52 can be mitigated during the rotation of the rotor 2. As a result, the width of the second offset bridge portion 52 can be reduced while securing the strength of the rotor core 15 against the centrifugal force. In FIG. 2, the second extending direction D2 is illustrated only for one second offset bridge portion 52 out of the pair of second offset bridge portions 52 separately arranged on both sides in the circumferential direction with respect to the magnetic pole center line 90. The second extending directions D2 of the pair of second offset bridge portions 52 are symmetrical directions across an axis of symmetry defined along the magnetic pole center line 90.

Figure 3:
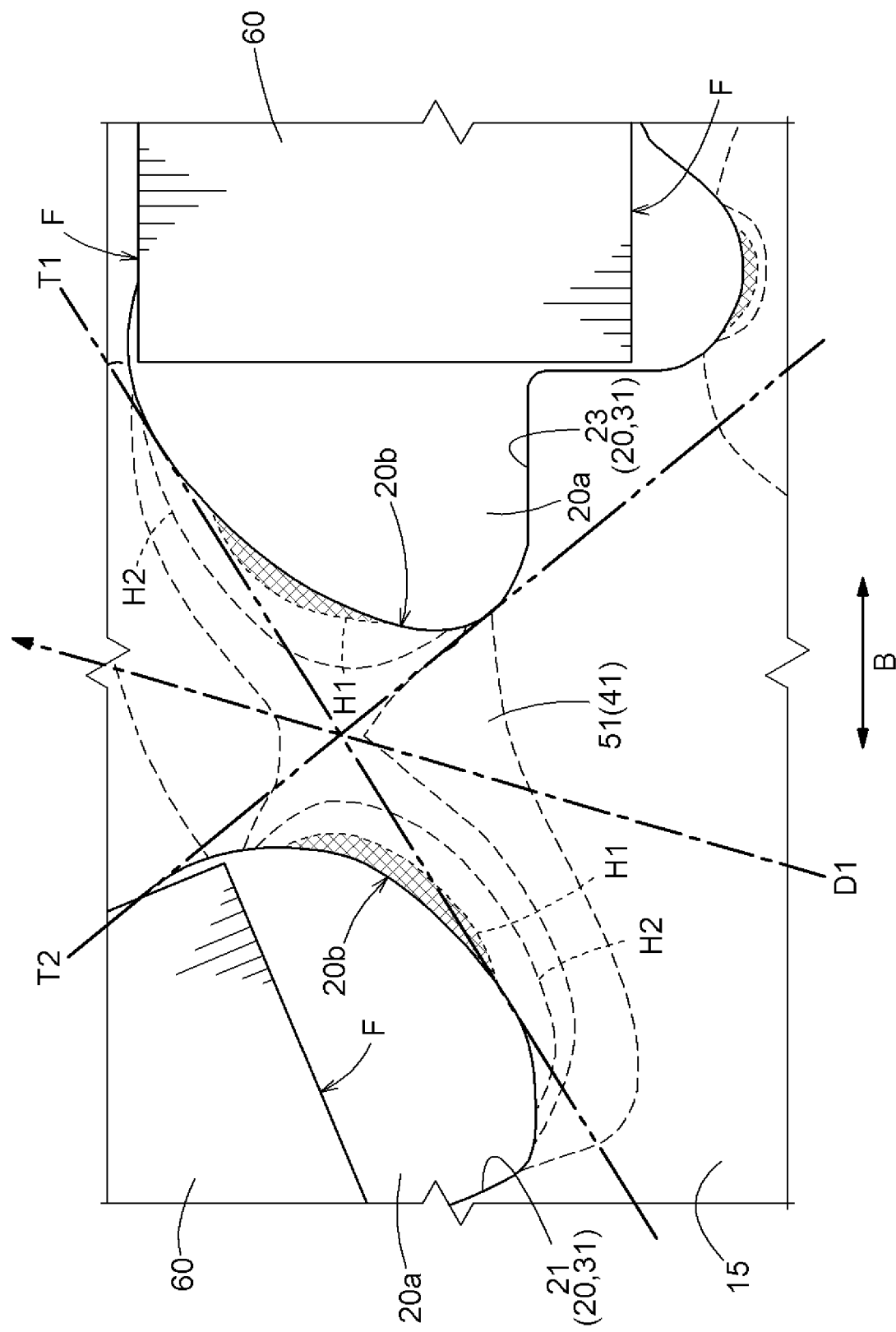
FIG. 3 is an analytic diagram illustrating stress distribution according to the embodiment.
Figure 4:
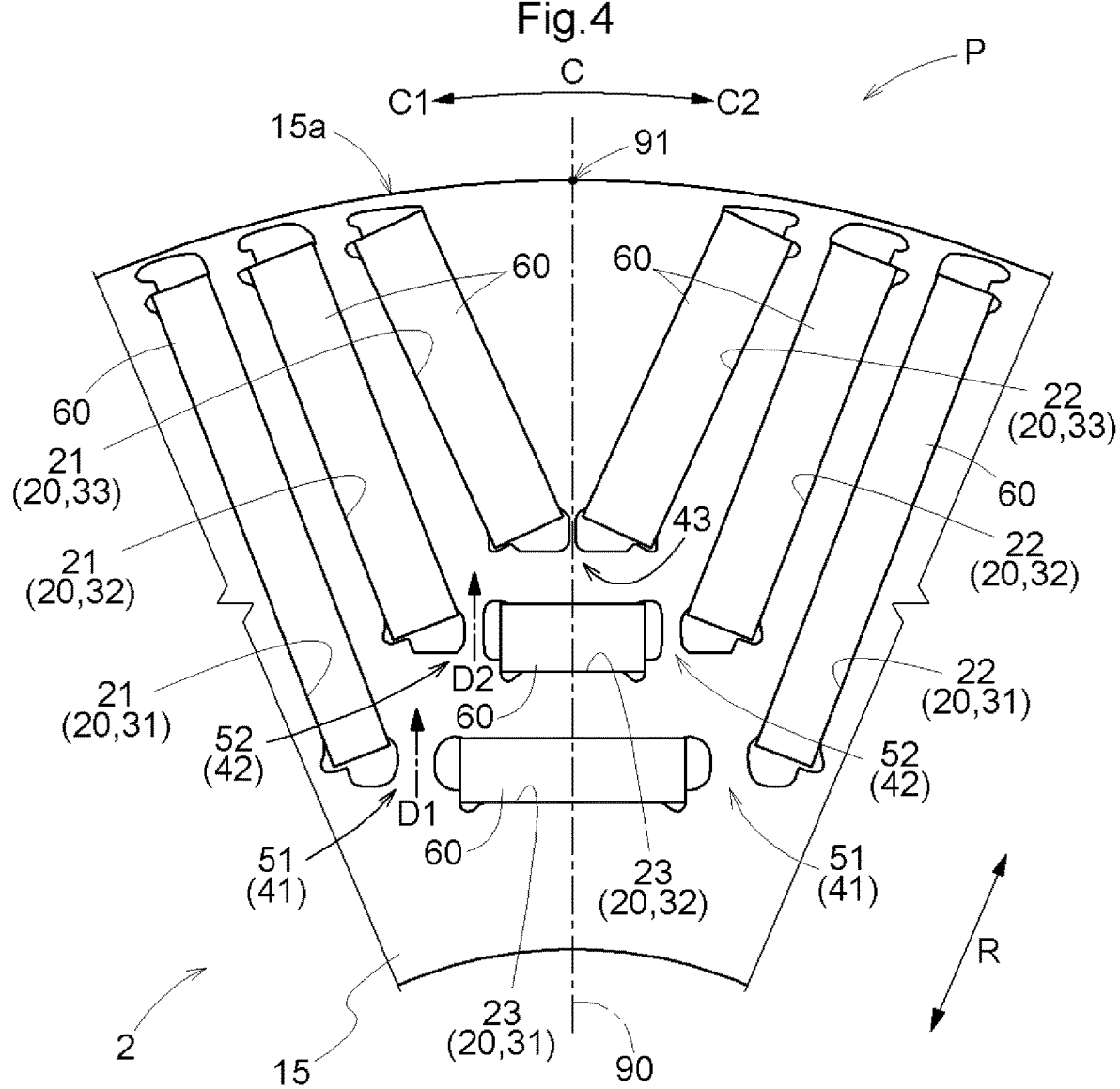
FIG. 4 is a sectional view orthogonal to the axial direction, illustrating a part of a rotor according to a comparative example.
Figure 5:
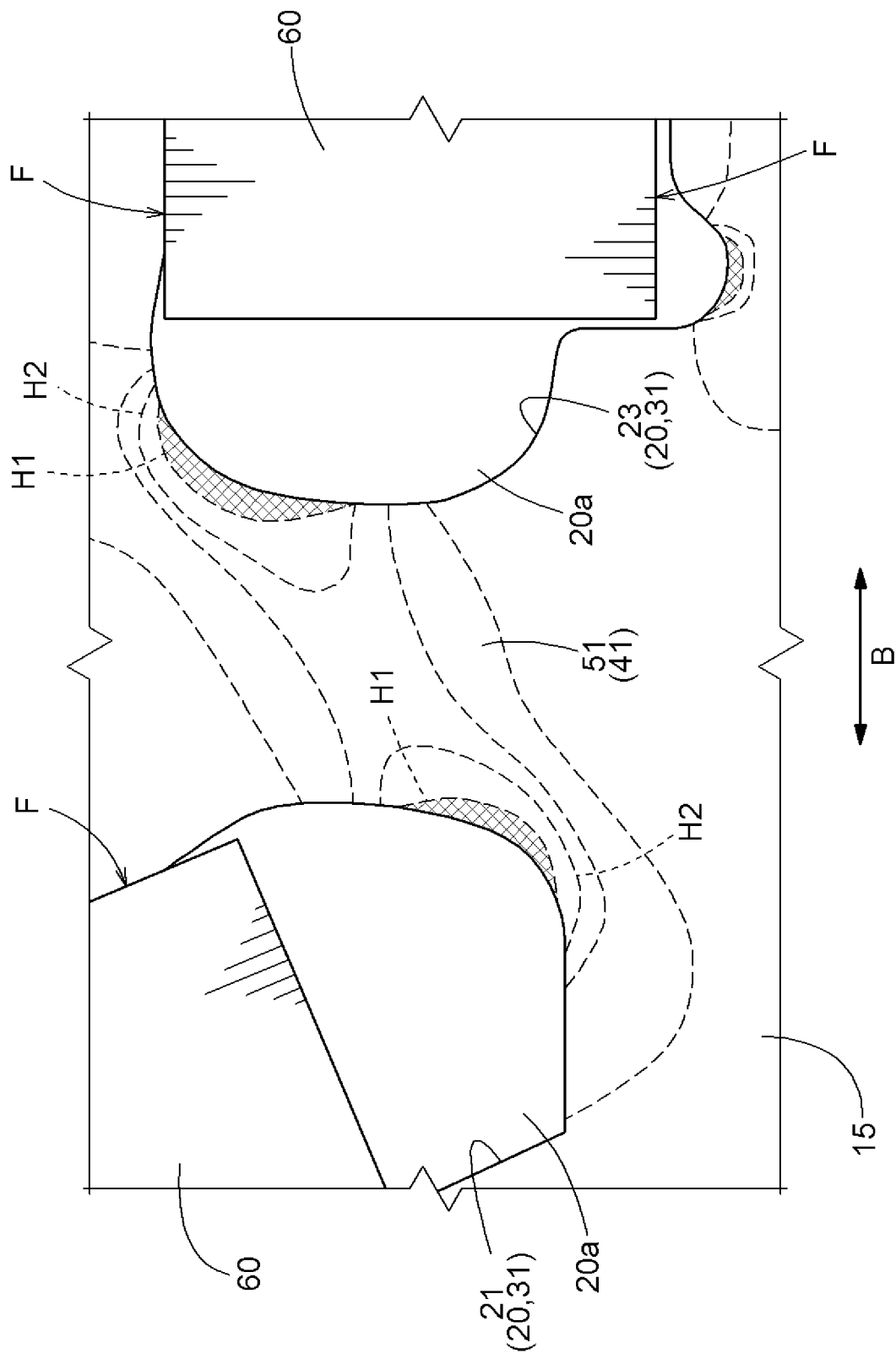
FIG. 5 is an analytic diagram illustrating stress distribution according to the comparative example.

FIG. 3 is an analytic diagram illustrating stress distribution at the first offset bridge portion 51 during the rotation of the rotor 2. In FIG. 3, the stress distribution is represented by level contour lines. That is, each dashed line is a level contour line connecting points where the magnitudes of the stress are equal. A level contour line represented by "H1" is a first level contour line H1 indicating that the stress is greatest. A level contour line represented by "H2" is a second level contour line H2 indicating that the stress is second greatest. In FIG. 3, areas where the stress is greatest (areas surrounded by the first level contour lines H1) are hatched to facilitate understanding of the stress distribution. FIG. 5 is an analytic diagram illustrating stress distribution at a first offset bridge portion 51 during rotation of a rotor 2 according to a comparative example illustrated in FIG. 4. The comparative example illustrated in FIG. 4 and FIG. 5 is not an example of the rotor for a rotating electrical machine disclosed herein, but the same reference symbols as those in FIG. 2 and FIG. 3 are assigned to facilitate comparison. As illustrated in FIG. 4, in the comparative example, both the first extending direction D1 that is the extending direction of the first offset bridge portion 51 in the cross section orthogonal to the axial direction L and the second extending direction D2 that is the extending direction of the second offset bridge portion 52 in the cross section orthogonal to the axial direction L are parallel to the magnetic pole center line 90. As is apparent from the comparison of FIG. 3 with FIG. 5 regarding the profiles of the first level contour line H1 and the second level contour line H2, the stress concentration on the first offset bridge portion 51 is mitigated in the rotor 2 according to this embodiment (FIG. 3) as compared to the rotor 2 according to the comparative example (FIG. 5).

As described above, this embodiment provides the structure in which the first extending direction D1 that is the extending direction of the first offset bridge portion 51 in the cross section orthogonal to the axial direction L is set along the direction to the first center of gravity G1 from the first offset bridge portion 51 (see FIG. 2). That is, in the cross section orthogonal to the axial direction L, the first offset bridge portion 51 is formed so as to extend toward the center of gravity on the magnetic pole center line 90 that corresponds to the magnetic pole P where the first offset bridge portion 51 is formed. The "center of gravity corresponding to the magnetic pole P where the first offset bridge portion 51 is formed" is the center of gravity of a support target portion that is a portion of the rotor core 15 that structures the magnetic pole P and is supported (may be regarded as being supported) by the first offset bridge portion 51. In this embodiment, the support target portion of the first offset bridge portion 51 is the first target portion 81, and therefore the first center of gravity G1 that is the center of gravity of the first target portion 81 is the center of gravity corresponding to the magnetic pole P where the first offset bridge portion 51 is formed. That is, in the cross section orthogonal to the axial direction L, the first offset bridge portion 51 is formed so as to extend toward the first center of gravity G1 on the magnetic pole center line 90.

This embodiment further provides the structure in which the second extending direction D2 that is the extending direction of the second offset bridge portion 52 in the cross section orthogonal to the axial direction L is set along the direction to the second center of gravity G2 from the second offset bridge portion 52 (see FIG. 2). That is, in the cross section orthogonal to the axial direction L, the second offset bridge portion 52 is formed so as to extend toward the center of gravity on the magnetic pole center line 90 that corresponds to the magnetic pole P where the second offset bridge portion 52 is formed. The "center of gravity corresponding to the magnetic pole P where the second offset bridge portion 52 is formed" is the center of gravity of a support target portion that is a portion of the rotor core 15 that structures the magnetic pole P and is supported (may be regarded as being supported) by the second offset bridge portion 52. In this embodiment, the support target portion of the second offset bridge portion 52 is the second target portion 82, and therefore the second center of gravity G2 that is the center of gravity of the second target portion 82 is the center of gravity corresponding to the magnetic pole P where the second offset bridge portion 52 is formed. That is, in the cross section orthogonal to the axial direction L, the second offset bridge portion 52 is formed so as to extend toward the second center of gravity G2 on the magnetic pole center line 90.

Figure 6:
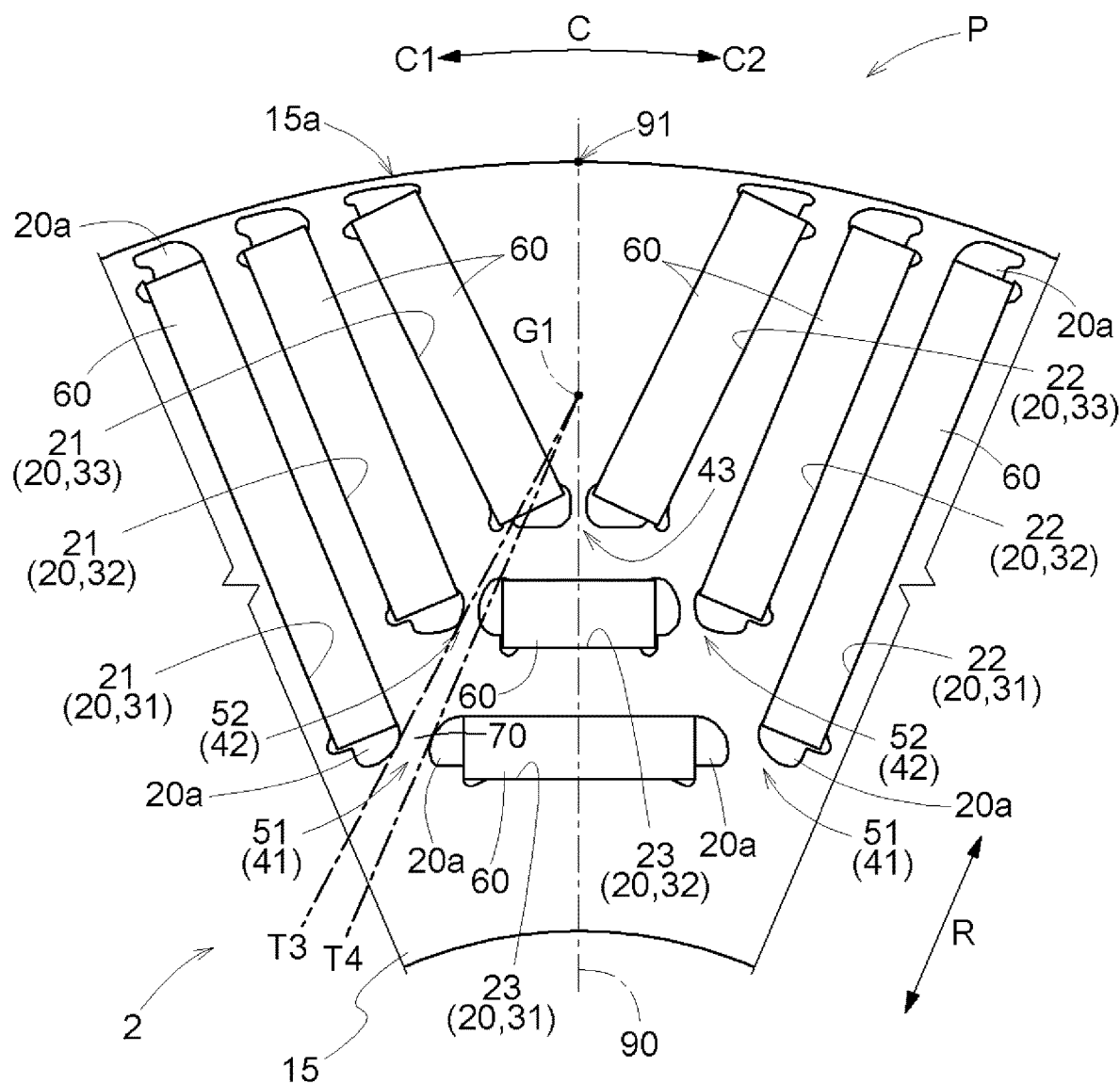
FIG. 6 is a sectional view orthogonal to the axial direction, illustrating a part of the rotor according to the embodiment.

In this embodiment, each of the first offset bridge portion 51 and the second offset bridge portion 52 is formed in a specific region 70 where the distance between two holes 20 is shortest in the cross section orthogonal to the axial direction L. For example, the distance between two holes 20 may be a distance in the circumferential direction C or a distance in a magnetic pole orthogonal direction B described later. As illustrated in FIG. 6, the first offset bridge portion 51 is formed in a specific region 70 where the distance between the first hole 21 and the third hole 23 that belong to the first surrounding hole group 31 is shortest. In FIG. 6, only the specific region formed between the first hole 21 and the third hole 23 that belong to the first surrounding hole group 31 is represented by the reference symbol "70", but the specific region 70 is present between two holes 20 in each combination of two holes 20 adjacent to each other in the circumferential direction C. For example, the second offset bridge portion 52 is formed in a specific region 70 where the distance between the first hole 21 and the third hole 23 that belong to the second surrounding hole group 32 is shortest.

In this embodiment, the first offset bridge portion 51 is formed so as to extend toward the first center of gravity G1 on the magnetic pole center line 90 in the cross section orthogonal to the axial direction L with a structure in which the first offset bridge portion 51 is formed in an area located between a third straight line T3 and a fourth straight line T4 in the cross section orthogonal to the axial direction L and the first offset bridge portion 51 is interposed between the two holes 20 on both sides in the circumferential direction C, with the two holes 20 entirely arranged outside the area located between the third straight line T3 and the fourth straight line T4. The second offset bridge portion 52 is formed so as to extend toward the second center of gravity G2 on the magnetic pole center line 90 in the cross section orthogonal to the axial direction L with a structure in which the second offset bridge portion 52 is formed in an area located between the third straight line T3 and the fourth straight line T4 in the cross section orthogonal to the axial direction L and the second offset bridge portion 52 is interposed between the two holes 20 on both sides in the circumferential direction C, with the two holes 20 entirely arranged outside the area located between the third straight line T3 and the fourth straight line T4. The third straight line T3 is a straight line passing through the end of the specific region 70 on the first circumferential side C1 and the center of gravity on the magnetic pole center line 90 in the cross section orthogonal to the axial direction L. The fourth straight line T4 is a straight line passing through the end of the specific region 70 on the second circumferential side C2 and the center of gravity on the magnetic pole center line 90 in the cross section orthogonal to the axial direction L. The center of gravity on the magnetic pole center line 90 is the first center of gravity G1 for the first offset bridge portion 51, and is the second center of gravity G2 for the second offset bridge portion 52.

Figure 7:
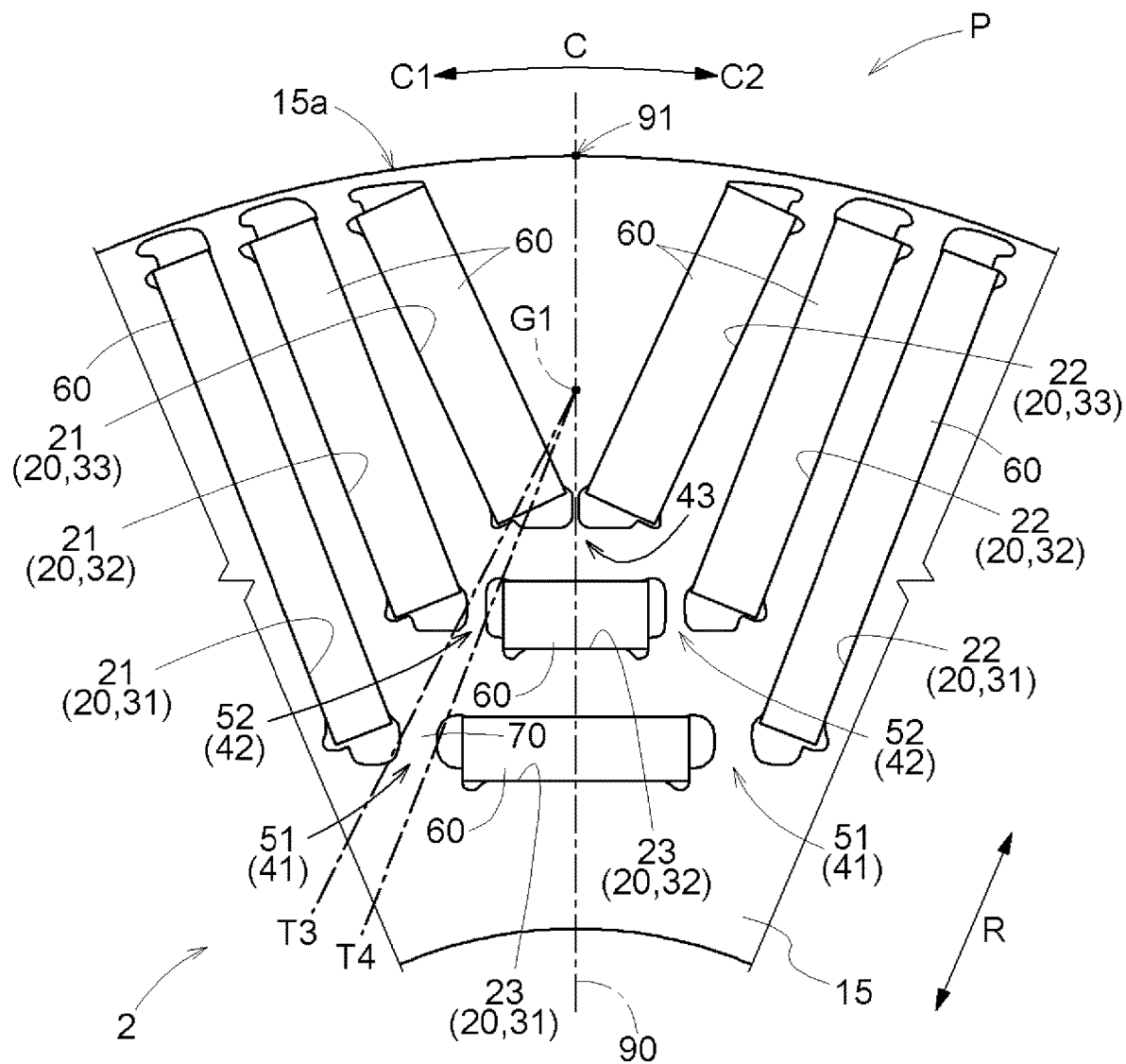
FIG. 7 is a sectional view orthogonal to the axial direction, illustrating a part of the rotor according to the comparative example.

Detailed description is given of the first offset bridge portion 51 formed between the first hole 21 and the third hole 23 that belong to the first surrounding hole group 31. As illustrated in FIG. 6, the third straight line T3 is a straight line passing through the end of the specific region 70 on the first circumferential side C1 and the first center of gravity G1, and the fourth straight line T4 is a straight line passing through the end of the specific region 70 on the second circumferential side C2 and the first center of gravity G1. The first offset bridge portion 51 is formed in the area located between the third straight line T3 and the fourth straight line T4. The first offset bridge portion 51 is interposed between the two holes 20 on both sides in the circumferential direction C, with the two holes 20 entirely arranged (in this case, the whole of the first hole 21 and the whole of the third hole 23) outside the area located between the third straight line T3 and the fourth straight line T4. Thus, the first offset bridge portion 51 is formed so as to extend toward the first center of gravity G1 on the magnetic pole center line 90 in the cross section orthogonal to the axial direction L. In the structure of the comparative example illustrated in FIG. 7 (structure similar to that in FIG. 4), the first offset bridge portion 51 is interposed between the two holes 20 on both sides in the circumferential direction C, with a part of at least one of the two holes 20 (in FIG. 7, a part of the first hole 21 and a part of the third hole 23) arranged inside the area located between the third straight line T3 and the fourth straight line T4. In the structure of the comparative example, the first offset bridge portion 51 is not formed so as to extend toward the first center of gravity G1 on the magnetic pole center line 90 in the cross section orthogonal to the axial direction L.

Description is herein given taking an exemplary case where the third straight line T3 and the fourth straight line T4 are set so that the distance between the third straight line T3 and the fourth straight line T4 decreases toward the center of gravity on the magnetic pole center line 90 (in this case, the first center of gravity G1 or the second center of gravity G2). The third straight line T3 and the fourth straight line T4 may be set so that the distance between the third straight line T3 and the fourth straight line T4 is constant (that is, the third straight line T3 and the fourth straight line T4 are parallel). That is, the third straight line T3 passing through the end of the specific region 70 on the first circumferential side C1 and the first center of gravity G1 and the fourth straight line T4 passing through the end of the specific region 70 on the second circumferential side C2 and the first center of gravity G1 may be set while the first center of gravity G1 is regarded as an area that spreads to some extent.

Lastly, description is given of definition of the extending direction of the bridge portion in the cross section orthogonal to the axial direction L. The extending directions of the bridge portions can be defined similarly except for the difference in the combinations of the two holes 20 that form the bridge portions. Therefore, the first extending direction D1 that is the extending direction of the first offset bridge portion 51 in the cross section orthogonal to the axial direction L is herein described with reference to FIG. 3. The two holes 20 that form the first offset bridge portion 51 are hereinafter referred to simply as two holes 20.

As illustrated in FIG. 3, portions that form the first offset bridge portion 51 at the outer edges of the two holes 20 (in this case, the first hole 21 and the third hole 23) are defined as bridge formation edges 20b. A direction orthogonal to the magnetic pole center line 90 in the cross section orthogonal to the axial direction L is defined as the magnetic pole orthogonal direction B. For example, an area located between the outer edges of the two holes 20 on both sides in the magnetic pole orthogonal direction B (area between the two holes 20, in which a line parallel to the magnetic pole orthogonal direction B intersects both the outer edges of the two holes 20) is defined as a bridge formation area. Portions that demarcate the bridge formation area at the outer edges of the two holes 20 can be defined as the bridge formation edges 20b. From the viewpoint of mitigating the stress concentration, it is preferable that the shape of the bridge formation edge 20b in the cross section orthogonal to the axial direction L be a shape (arc shape) in which the curvature is constant and the center of curvature is located within the hole 20 or a shape in which the curvature changes continuously and the center of curvature of each part is located within the hole 20. In this embodiment, the shape of the bridge formation edge 20b in the cross section orthogonal to the axial direction L is the latter shape. In this embodiment, the bridge formation edge 20b is structured by a part of the outer edge of the magnetic resistance portion 20a.

As illustrated in FIG. 3, two common inner tangents to the bridge formation edge 20b of one hole 20 and the bridge formation edge 20b of the other hole 20 out of the two holes 20 in the cross section orthogonal to the axial direction L are defined as a first straight line T1 and a second straight line T2. The common inner tangent is a tangent common to the two bridge formation edges 20b, across which the two bridge formation edges 20b are located opposite to each other. In this embodiment, based on the first straight line T1 and the second straight line T2 defined as described above, the first extending direction D1 is set as a direction along a line segment that halves an angle between the first straight line T1 and the second straight line T2 and does not intersect the two holes 20.

The first extending direction D1 may be defined by a method other than the method described above. For example, the first extending direction D1 may be set along a straight line defined based on central positions of the bridge formation area described above in the magnetic pole orthogonal direction B at a plurality of positions in a direction parallel to the magnetic pole center line 90 in the cross section orthogonal to the axial direction L (a straight line passing through a plurality of central positions or an approximate curve defined based on a plurality of central positions). In this case, the plurality of positions may include both ends of the bridge formation area in the direction parallel to the magnetic pole center line 90, and the center of the bridge formation area in the direction parallel to the magnetic pole center line 90. Further, the first extending direction D1 may be set as a direction in which the distance between two parallel tangents to the two bridge formation edges 20b is longest in the cross section orthogonal to the axial direction L (extending direction of the tangents).

Other Embodiments

Next, other embodiments of the rotor for a rotating electrical machine are described.

(1) In the embodiment described above, description is given taking the exemplary structure in which the second extending direction D2 is set along the direction to the second center of gravity G2 (from the second offset bridge portion 52). However, the present disclosure is not limited to this structure. There may be employed a structure in which the second extending direction D2 is not set along the direction to the second center of gravity G2. In this case as well, it is preferable that the second extending direction D2 be set as a direction inclined with respect to the magnetic pole center line 90 so as to approach the magnetic pole center line 90 toward the outer side in the radial direction R (from the second offset bridge portion 52). In this case, a straight line obtained by extending the second extending direction D2 from the second offset bridge portion 52 intersects the magnetic pole center line 90 at a position different from the second center of gravity G2. For example, there may be employed a structure in which the second extending direction D2 is set along the direction to the first center of gravity G1 (from the second offset bridge portion 52).

(2) In the embodiment described above, description is given taking the exemplary structure in which the first extending direction D1 is set along the direction to the first center of gravity G1 (from the first offset bridge portion 51). However, the present disclosure is not limited to this structure. There may be employed a structure in which the first extending direction D1 is set as a direction inclined with respect to the magnetic pole center line 90 so as to approach the magnetic pole center line 90 toward the outer side in the radial direction R (from the first offset bridge portion 51) but not along the direction to the first center of gravity G1. In this case, a straight line obtained by extending the first extending direction D1 from the first offset bridge portion 51 intersects the magnetic pole center line 90 at a position different from the first center of gravity G1. For example, there may be employed a structure in which the first extending direction D1 is set along the direction to the second center of gravity G2 (from the first offset bridge portion 51).

(3) In the embodiment described above, description is given taking the exemplary structure in which the rotor core 15 includes the second surrounding hole group 32 and the third surrounding hole group 33 in addition to the first surrounding hole group 31. However, the present disclosure is not limited to this structure. For example, there may be employed a structure in which the rotor core 15 includes only the first surrounding hole group 31 and the second surrounding hole group 32, a structure in which the rotor core 15 includes only the first surrounding hole group 31 and the third surrounding hole group 33, or a structure in which the rotor core 15 includes only the first surrounding hole group 31. Further, there may be employed a structure in which the rotor core 15 includes, in addition to at least the first surrounding hole group 31, a fourth surrounding hole group that surrounds the magnetic pole center point 91 on a side farther away from the magnetic pole center point 91 than the first surrounding hole group 31.

(4) In the embodiment described above, description is given taking the exemplary structure in which the plurality of holes 20 that form the first surrounding hole group 31 include one first hole 21 and one second hole 22 and the plurality of holes 20 that form the second surrounding hole group 32 include one first hole 21 and one second hole 22. However, the present disclosure is not limited to this structure. There may be employed a structure in which the plurality of holes 20 that form the first surrounding hole group 31 include a plurality of first holes 21 and a plurality of second holes 22, or a structure in which the plurality of holes 20 that form the second surrounding hole group 32 include a plurality of first holes 21 and a plurality of second holes 22. In this case, the first offset bridge portion 51 or the second offset bridge portion 52 is formed between two first holes 21 adjacent to each other in the circumferential direction C or between two second holes 22 adjacent to each other in the circumferential direction C.

(5) In the embodiment described above, description is given taking the exemplary structure in which the plurality of holes 20 that form the first surrounding hole group 31 include the third hole 23 and the plurality of holes 20 that form the second surrounding hole group 32 include the third hole 23. However, the present disclosure is not limited to this structure. There may be employed a structure in which the plurality of holes 20 that form the first surrounding hole group 31 do not include the third hole 23 (for example, a structure in which only a plurality of first holes 21 and a plurality of second holes 22 are included), or a structure in which the plurality of holes 20 that form the second surrounding hole group 32 do not include the third hole 23 (for example, a structure in which only a plurality of first holes 21 and a plurality of second holes 22 are included).

(6) In the embodiment described above, description is given taking the exemplary structure in which all of the first holes 21, the second holes 22, and the third holes 23 are the magnet insertion holes. However, the present disclosure is not limited to this structure. For example, there may be employed a structure in which no permanent magnet 60 is arranged in the third hole 23. For example, there may be employed a structure in which the whole of the third hole 23 is a hollow (air space), or a structure in which the whole of the third hole 23 is filled with a non-magnetic filler (for example, a resin).

(7) In the embodiment described above, description is given taking the exemplary structure in which the plurality of holes 20 provided in each magnetic pole P include the first holes 21 and the second holes 22 in each of which the permanent magnet 60 having the planar magnetic pole surfaces F is arranged. However, the present disclosure is not limited to this structure. There may be employed a structure in which a permanent magnet having curved magnetic pole surfaces is arranged in each of the first holes 21 and the second holes 22.

(8) The structures disclosed in the embodiments described above are also applicable in combination with the structures disclosed in the other embodiments without causing any contradiction (including combinations of the embodiments described as other embodiments). Regarding other structures as well, the embodiments disclosed herein are only illustrative in all respects. Thus, various modifications may be made as appropriate without departing from the spirit of the disclosure.

Summary of Embodiments

A summary of the rotor for a rotating electrical machine described above is described below.

The rotor (2) for a rotating electrical machine includes the rotor core (15) and the permanent magnets (60) arranged in the rotor core (15). In each of the plurality of magnetic poles (P), the rotor core (15) has the plurality of holes (20) including the first hole (21) and the second hole (22) in each of which the permanent magnet (60) having the planar magnetic pole surface (F) is arranged. The first hole (21) and the second hole (22) are separately arranged on both sides in the circumferential direction (C) with respect to the magnetic pole center line (90) extending in the radial direction (R) through the center of the magnetic pole (P) in the circumferential direction (C) so that the separation distance between the first hole (21) and the second hole (22) in the circumferential direction (C) increases toward the outer side in the radial direction (R). The rotor core (15) has the plurality of bridge portions (41) each formed between two of the holes (20) that are adjacent to each other in the circumferential direction (C). The plurality of bridge portions (41) include the offset bridge portion (51) located at the position shifted in the circumferential direction (C) from the magnetic pole center line (90). The extending direction (D1) of the offset bridge portion (51) in the cross section orthogonal to the axial direction (L) is inclined with respect to the magnetic pole center line (90) so as to approach the magnetic pole center line (90) toward the outer side in the radial direction (R).

According to this structure, the extending direction (D1) of the offset bridge portion (51) in the cross section orthogonal to the axial direction (L) is the direction inclined with respect to the magnetic pole center line (90) so as to approach the magnetic pole center line (90) toward the outer side in the radial direction (R). Therefore, the stress concentration on the offset bridge portion (51) can be mitigated during the rotation of the rotor (2) as compared to the case where the extending direction (D1) is set as the direction parallel to the magnetic pole center line (90). As a result, the width of the offset bridge portion (51) can be reduced while appropriately securing the strength of the rotor core (15) against the centrifugal force.

To give supplementary description, during the rotation of the rotor (2), the offset bridge portion (51) supports, against the centrifugal force, the radially outer portion of the rotor core (15) in the magnetic pole (P) where the offset bridge (51) is provided (hereinafter referred to as "support target portion" in this paragraph). When consideration is made using a simplified model, the centrifugal force is applied to the center of gravity of an object. Therefore, a tensile load toward the center of gravity of the support target portion is applied to the offset bridge portion (51) during the rotation of the rotor (2). The sectional shape orthogonal to the axial direction (L) at the portion of the rotor core (15) that structures one magnetic pole is a symmetrical shape or a shape analogous to the symmetrical shape across the axis of symmetry defined along the magnetic pole center line (90). Therefore, the center of gravity of the support target portion is generally located on the outer side in the radial direction (R) and on the magnetic pole center side in the circumferential direction (C) with respect to the offset bridge portion (51). In this respect, according to the structure described above, the extending direction (D1) of the offset bridge portion (51) in the cross section orthogonal to the axial direction (L) is the direction that approaches the magnetic pole center line (90) toward the outer side in the radial direction (R). Thus, the extending direction (D1) of the offset bridge portion (51) is brought closer to the direction in which the tensile load is applied, and the flexural stress generated in the offset bridge portion (51) during the rotation of the rotor (2) can be reduced as compared to the case where the extending direction (D1) is set as the direction parallel to the magnetic pole center line (90). Along with the reduction of the flexural stress generated in the offset bridge portion (51), the stress concentration on the offset bridge portion (51) can be mitigated during the rotation of the rotor (2). As a result, the width of the offset bridge portion (51) can be reduced while securing the strength of the rotor core (15) against the centrifugal force.

As described above, according to the structure described above, it is possible to attain a rotor (2) for a rotating electrical machine in which the width of the offset bridge portion (51) can be reduced while appropriately securing the strength of the rotor core (15) against the centrifugal force.

According to the structure described above, the permanent magnet (60) having the planar magnetic pole surface (F) can be used as the permanent magnet (60) arranged in each of the first hole (21) and the second hole (22). Thus, there is an advantage in that a necessary remanent flux density is secured easily while reducing costs as compared to the case of using the permanent magnet having the curved magnetic pole surface. Further, the first hole (21) and the second hole (22) are arranged so that the separation distance therebetween in the circumferential direction (C) increases toward the outer side in the radial direction (R). Thus, there is an advantage in that a reluctance torque can be used.

It is preferable that the plurality of holes (20) in each of the plurality of magnetic poles (P) be arranged so as to form the surrounding hole group (31) that surrounds the magnetic pole center point (91) that is the intersection of the magnetic pole center line (90) and the outer peripheral surface (15a) of the rotor core (15), and the extending direction (D1) of the offset bridge portion (51) in the cross section orthogonal to the axial direction (L) be set along the direction to the center of gravity (G1) of the target portion (81) surrounded by the surrounding hole group (31).

According to this structure, the extending direction (D1) of the offset bridge portion (51) can be caused to coincide with the direction of the tensile load applied to the offset bridge portion (51) during the rotation of the rotor (2). Thus, the flexural stress generated in the offset bridge portion (51) during the rotation of the rotor (2) is further reduced, whereby the stress concentration on the offset bridge portion (51) can further be mitigated during the rotation of the rotor (2).

The rotor (2) for a rotating electrical machine includes the rotor core (15) and the permanent magnets (60) arranged in the rotor core (15). In each of the plurality of magnetic poles (P), the rotor core (15) has the plurality of holes (20) including the magnet insertion holes (21, 22) where the permanent magnets (60) are arranged. The plurality of holes (20) in each of the plurality of magnetic poles (P) are arranged so as to form the surrounding hole group (31) that surrounds the magnetic pole center point (91) that is the intersection of the outer peripheral surface (15a) of the rotor core (15) and the magnetic pole center line (90) extending in the radial direction (R) through the center of the magnetic pole (P) in the circumferential direction (C). The rotor core (15) has the plurality of bridge portions (41) each formed between two of the holes (20) that are adjacent to each other in the circumferential direction (C). The plurality of bridge portions (41) include the offset bridge portion (51) located at the position shifted in the circumferential direction (C) from the magnetic pole center line (90). The extending direction (D1) of the offset bridge portion (51) in the cross section orthogonal to the axial direction (L) is set along the direction to the center of gravity (G1) of the target portion (81) surrounded by the surrounding hole group (31).

According to this structure, the extending direction (D1) of the offset bridge portion (51) in the cross section orthogonal to the axial direction (L) is set along the direction to the center of gravity (G1) of the target portion (81) surrounded by the surrounding hole group (31). Therefore, the stress concentration on the offset bridge portion (51) can be mitigated during the rotation of the rotor (2) as compared to the case where the extending direction (D1) is set as the direction parallel to the magnetic pole center line (90). As a result, the width of the offset bridge portion (51) can be reduced while appropriately securing the strength of the rotor core (15) against the centrifugal force.

To give supplementary description, during the rotation of the rotor (2), the offset bridge portion (51) supports, against the centrifugal force, the target portion (81) surrounded by the surrounding hole group (31). When consideration is made using a simplified model, the centrifugal force is applied to the center of gravity of an object. Therefore, a tensile load toward the center of gravity (G1) of the target portion (81) is applied to the offset bridge portion (51) during the rotation of the rotor (2). In this respect, according to the structure described above, the extending direction (D1) of the offset bridge portion (51) in the cross section orthogonal to the axial direction (L) is set along the direction to the center of gravity (G1) of the target portion (81). Thus, the extending direction (D1) of the offset bridge portion (51) coincides with the direction in which the tensile load is applied, and the flexural stress generated in the offset bridge portion (51) during the rotation of the rotor (2) can be reduced. Along with the reduction of the flexural stress generated in the offset bridge portion (51), the stress concentration on the offset bridge portion (51) can be mitigated during the rotation of the rotor (2). As a result, the width of the offset bridge portion (51) can be reduced while securing the strength of the rotor core (15) against the centrifugal force.

As described above, according to the structure described above, it is possible to attain the rotor (2) for a rotating electrical machine in which the width of the offset bridge portion (51) can be reduced while appropriately securing the strength of the rotor core (15) against the centrifugal force.

According to the structure described above, the plurality of holes (20) are arranged so as to form the surrounding hole group (31) that surrounds the magnetic pole center point (91). Thus, there is an advantage in that the reluctance torque can be used.

In the structure in which the extending direction (D1) of the offset bridge portion (51) in the cross section orthogonal to the axial direction (L) is set along the direction to the center of gravity (G1) of the target portion (81) as described above, it is preferable that the rotor core (15) have, in each of the plurality of magnetic poles (P), the plurality of holes (20) that form the second surrounding hole group (32) that surrounds the magnetic pole center point (91) on the side closer to the magnetic pole center point (91) than the surrounding hole group (31), and also have the plurality of second bridge portions (42) each formed between the plurality of holes (20) that form the second surrounding hole group (32), the plurality of second bridge portions (42) include the second offset bridge portion (52) located at the position shifted in the circumferential direction (C) from the magnetic pole center line (90), and the extending direction (D2) of the second offset bridge portion (52) in the cross section orthogonal to the axial direction (L) be set along the direction to the center of gravity (G2) of the second target portion (82) surrounded by the second surrounding hole group (32).

According to this structure, the extending direction (D2) of the second offset bridge portion (52) in the cross section orthogonal to the axial direction (L) is set along the direction to the center of gravity (G2) of the second target portion (82) surrounded by the second surrounding hole group (32). Therefore, the stress concentration on the second offset bridge portion (52) can be mitigated during the rotation of the rotor (2) as compared to a case where the extending direction (D2) is set as the direction parallel to the magnetic pole center line (90). As a result, the width of the second offset bridge portion (52) can be reduced as well as the width of the first offset bridge portion (51) while appropriately securing the strength of the rotor core (15) against the centrifugal force.

To give supplementary description, during the rotation of the rotor (2), the second offset bridge portion (52) supports, against the centrifugal force, the second target portion (82) surrounded by the second surrounding hole group (32). When consideration is made using a simplified model, the centrifugal force is applied to the center of gravity of an object. Therefore, a tensile load toward the center of gravity (G2) of the second target portion (82) is applied to the second offset bridge portion (52) during the rotation of the rotor (2). In this respect, according to the structure described above, the extending direction (D2) of the second offset bridge portion (52) in the cross section orthogonal to the axial direction (L) is set along the direction to the center of gravity (G2) of the second target portion (82). Thus, the extending direction (D2) of the second offset bridge portion (52) coincides with the direction in which the tensile load is applied, and the flexural stress generated in the second offset bridge portion (52) during the rotation of the rotor (2) can be reduced. Along with the reduction of the flexural stress generated in the second offset bridge portion (52), the stress concentration on the second offset bridge portion (52) can be mitigated during the rotation of the rotor (2). As a result, the width of the second offset bridge portion (52) can be reduced while securing the strength of the rotor core (15) against the centrifugal force.

In the rotor (2) for a rotating electrical machine in each of the structures described above, it is preferable that the portions that form the offset bridge portion (51) at the outer edges of the two holes (20) be defined as the bridge formation edges (20b), the two common inner tangents to one of the bridge formation edges (20b) and the other one of the bridge formation edges (20b) of the two holes (20) in the cross section orthogonal to the axial direction (L) be defined as the first straight line (T1) and the second straight line (T2), and the extending direction (D1) of the offset bridge portion (51) in the cross section orthogonal to the axial direction (L) be the direction along the line segment that halves the angle between the first straight line (T1) and the second straight line (T2) and does not intersect the two holes (20).

According to this structure, the extending direction (D1) of the offset bridge portion (51) can be set appropriately.

The rotor (2) for a rotating electrical machine includes the rotor core (15) and the permanent magnets (60) arranged in the rotor core (15). In each of the plurality of magnetic poles (P), the rotor core (15) has the plurality of holes (20) including the first hole (21) and the second hole (22) in each of which the permanent magnet (60) having the planar magnetic pole surface (F) is arranged. The first hole (21) and the second hole (22) are separately arranged on both sides in the circumferential direction (C) with respect to the magnetic pole center line (90) extending in the radial direction (R) through the center of the magnetic pole (P) in the circumferential direction (C) so that the separation distance between the first hole (21) and the second hole (22) in the circumferential direction (C) increases toward the outer side in the radial direction (R). The rotor core (15) has the plurality of bridge portions (41) each formed between two of the holes (20) that are adjacent to each other in the circumferential direction (C). The plurality of bridge portions (41) include the offset bridge portion (51) located at the position shifted in the circumferential direction (C) from the magnetic pole center line (90). In the cross section orthogonal to the axial direction (L), the offset bridge portion (51) is formed so as to extend toward the center of gravity (G1) on the magnetic pole center line (90) that corresponds to the magnetic pole (P) where the offset bridge portion (51) is formed.

According to this structure, in the cross section orthogonal to the axial direction (L), the offset bridge portion (51) is formed so as to extend toward the center of gravity (G1) on the magnetic pole center line (90) that corresponds to the magnetic pole (P) where the offset bridge portion (51) is formed. Therefore, the stress concentration on the offset bridge portion (51) can be mitigated during the rotation of the rotor (2) as compared to the case where the offset bridge portion (51) is not formed so as to extend toward the center of gravity (G1). As a result, the width of the offset bridge portion (51) can be reduced while appropriately securing the strength of the rotor core (15) against the centrifugal force.

To give supplementary description, during the rotation of the rotor (2), the offset bridge portion (51) supports, against the centrifugal force, the radially outer portion of the rotor core (15) in the magnetic pole (P) where the offset bridge (51) is provided. When consideration is made using a simplified model, the centrifugal force is applied to the center of gravity of an object. Therefore, a tensile load toward the center of gravity (G1) on the magnetic pole center line (90) that corresponds to each magnetic pole (P) is applied to the offset bridge portion (51) during the rotation of the rotor (2). In this respect, according to the structure described above, in the cross section orthogonal to the axial direction (L), the offset bridge portion (51) is formed so as to extend toward the center of gravity (G1) on the magnetic pole center line (90) that corresponds to each magnetic pole (P). Thus, the direction of the offset bridge portion (51)

coincides with the direction in which the tensile load is applied, and the flexural stress generated in the offset bridge portion (51) during the rotation of the rotor (2) can be reduced. Along with the reduction of the flexural stress generated in the offset bridge portion (51), the stress concentration on the offset bridge portion (51) can be mitigated during the rotation of the rotor (2). As a result, the width of the offset bridge portion (51) can be reduced while securing the strength of the rotor core (15) against the centrifugal force.

As described above, according to the structure described above, it is possible to attain the rotor (2) for a rotating electrical machine in which the width of the offset bridge portion (51) can be reduced while appropriately securing the strength of the rotor core (15) against the centrifugal force.

According to the structure described above, the permanent magnet (60) having the planar magnetic pole surface (F) can be used as the permanent magnet (60) arranged in each of the first hole (21) and the second hole (22). Thus, there is an advantage in that a necessary remanent flux density is secured easily while reducing costs as compared to the case of using the permanent magnet having the curved magnetic pole surface. Further, the first hole (21) and the second hole (22) are arranged so that the separation distance therebetween in the circumferential direction (C) increases toward the outer side in the radial direction (R). Thus, there is an advantage in that the reluctance torque can be used.

It is preferable that the offset bridge portion (51) be formed in the specific region (70) where the distance between the two holes (20) is shortest in the cross section orthogonal to the axial direction (L).

According to this structure, the offset bridge portion (51) that can mitigate the stress concentration during the rotation of the rotor (2) as described above can be formed in the specific region (70) where the strength is likely to decrease due to the short distance between the two holes (20). Thus, the stress concentration on the specific region (70) can be mitigated during the rotation of the rotor (2). As a result, the strength necessary for the specific region (70) is secured easily.

In the structure in which the offset bridge portion (51) is formed in the specific region (70) as described above, it is preferable that, in the cross section orthogonal to the axial direction (L), the straight line passing through the end of the specific region (70) on one side (C1) in the circumferential direction (C) and the center of gravity (G1) be defined as the third straight line (T3) and the straight line passing through the end of the specific region (70) on the other side (C2) in the circumferential direction (C) and the center of gravity (G1) be defined as the fourth straight line (T4), and the offset bridge portion (51) be formed in the area located between the third straight line (T3) and the fourth straight line (T4) in the cross section orthogonal to the axial direction (L) and the offset bridge portion (51) be interposed between the two holes (20) on both sides in the circumferential direction (C), with the two holes (20) entirely arranged outside the area located between the third straight line (T3) and the fourth straight line (T4).

According to this structure, the offset bridge portion (51) can be formed so as to extend toward the center of gravity (G1) from the specific region (70) in the cross section orthogonal to the axial direction (L). Thus, the stress concentration on the specific region (70) can further be mitigated during the rotation of the rotor (2).

The rotor for a rotating electrical machine disclosed herein suffices if at least one of the effects described above can be attained.

The invention claimed is:

1. A rotor for a rotating electrical machine, the rotor comprising:
   a rotor core having a plurality of magnetic poles; and
   a plurality of permanent magnets arranged in the rotor core, wherein:
      in each of the plurality of magnetic poles, the rotor core has a plurality of holes including a first hole and a second hole in each of which a respective permanent magnet of the plurality of permanent magnets having a planar magnetic pole surface is arranged,
      the first hole and the second hole are separately arranged on both sides in a circumferential direction with respect to a magnetic pole center line extending in a radial direction through a center of a magnetic pole of the plurality of magnetic poles in the circumferential direction so that a separation distance between the first hole and the second hole in the circumferential direction increases toward an outer side in the radial direction,
      the rotor core has a plurality of bridges each formed between two holes of the plurality of holes that are adjacent to each other in the circumferential direction,
      the plurality of bridges include an offset bridge located at a position shifted in the circumferential direction from the magnetic pole center line,
      an extending direction of the offset bridge in a cross section orthogonal to an axial direction is inclined with respect to the magnetic pole center line so as to approach the magnetic pole center line toward the outer side in the radial direction,
      the plurality of holes in each of the plurality of magnetic poles are arranged so as to form a surrounding hole group that surrounds a magnetic pole center point that is an intersection of the magnetic pole center line and an outer peripheral surface of the rotor core, and
      the extending direction of the offset bridge in the cross section orthogonal to the axial direction is set along a direction directly to a center of gravity of a target surrounded by the surrounding hole group, the target being the portion of the rotor core that is surrounded by the surrounding hole group at a radially outer side of the surrounding hole group.

2. The rotor according to claim 1, wherein
   the rotor core has, in each of the plurality of magnetic poles, the plurality of holes that form a second surrounding hole group that surrounds the magnetic pole center point on a side closer to the magnetic pole center point than the surrounding hole group, and also has a plurality of second bridges each formed between the plurality of holes that form the second surrounding hole group,
   the plurality of second bridges include a second offset bridge located at a position shifted in the circumferential direction from the magnetic pole center line, and
   an extending direction of the second offset bridge in the cross section orthogonal to the axial direction is set along a direction to a center of gravity of a second target surrounded by the second surrounding hole group.

3. The rotor according to claim 1, wherein
   portions that form the offset bridge at outer edges of the two holes are defined as bridge formation edges,
   two common inner tangents to one of the bridge formation edges and the other one of the bridge formation edges of the two holes in the cross section orthogonal to the axial direction are defined as a first straight line and a second straight line, and the extending direction of the offset bridge in the cross section orthogonal to the axial direction is a direction along a line segment that halves an angle between the first straight line and the second straight line and does not intersect the two holes.

4. A rotor for a rotating electrical machine, the rotor comprising:
 a rotor core having a plurality of magnetic poles; and
 a plurality of permanent magnets arranged in the rotor core, wherein
  in each of the plurality of magnetic poles, the rotor core has a plurality of holes including magnet insertion holes where the permanent magnets are arranged,
  the plurality of holes in each of the plurality of magnetic poles are arranged so as to form a surrounding hole group that surrounds a magnetic pole center point that is an intersection of an outer peripheral surface of the rotor core and a magnetic pole center line extending in a radial direction through a center of a magnetic pole of the plurality of magnetic poles in a circumferential direction,
  the rotor core has a plurality of bridges each formed between two holes of the plurality of holes that are adjacent to each other in the circumferential direction,
  the plurality of bridges include an offset bridge located at a position shifted in the circumferential direction from the magnetic pole center line, and
  an extending direction of the offset bridge in a cross section orthogonal to an axial direction is set along a direction directly to a center of gravity of a target surrounded by the surrounding hole group, the target being the portion of the rotor core that is surrounded by the surrounding hole group at a radially outer side of the surrounding hole group.

5. A rotor for a rotating electrical machine, the rotor comprising:
 a rotor core having a plurality of magnetic poles; and
 a permanent magnet arranged in the rotor core, wherein
  in each of the plurality of magnetic poles, the rotor core has a plurality of holes including a first hole and a second hole in each of which the permanent magnet having a planar magnetic pole surface is arranged,
  the first hole and the second hole are separately arranged on both sides in a circumferential direction with respect to a magnetic pole center line extending in a radial direction through a center of a magnetic pole of the plurality of magnetic poles in the circumferential direction so that a separation distance between the first hole and the second hole in the circumferential direction increases toward an outer side in the radial direction,
  the rotor core has a plurality of bridges each formed between two of the holes that are adjacent to each other in the circumferential direction,
  the plurality of bridges include an offset bridge located at a position shifted in the circumferential direction from the magnetic pole center line, and
  in a cross section orthogonal to an axial direction, the offset bridge is formed so as to extend directly toward a center of gravity of the portion of the rotor core where the magnet pole is formed that is on the magnetic pole center line that corresponds to the magnetic pole where the offset bridge is formed.

6. The rotor according to claim 5, wherein the offset bridge is formed in a specific region where a distance between the two holes is shortest in the cross section orthogonal to the axial direction.

7. The rotor according to claim 6, wherein
 in the cross section orthogonal to the axial direction, a straight line passing through an end of the specific region on one side in the circumferential direction and the center of gravity is defined as a third straight line and a straight line passing through an end of the specific region on the other side in the circumferential direction and the center of gravity is defined as a fourth straight line, and
 the offset bridge is formed in an area located between the third straight line and the fourth straight line in the cross section orthogonal to the axial direction and the offset bridge is interposed between the two holes on both sides in the circumferential direction, with the two holes entirely arranged outside the area located between the third straight line and the fourth straight line.

* * * * *